(12) United States Patent
Mak et al.

(10) Patent No.: US 8,872,773 B2
(45) Date of Patent: Oct. 28, 2014

(54) ELECTRONIC DEVICE AND METHOD OF CONTROLLING SAME

(75) Inventors: Genevieve Elizabeth Mak, Toronto (CA); Danny Thomas Dodge, Ottawa (CA); George Ross Staikos, Toronto (CA)

(73) Assignee: BlackBerry Limited, Waterloo (CA)

( * ) Notice: Subject to any disclaimer, the term of this patent is extended or adjusted under 35 U.S.C. 154(b) by 381 days.

(21) Appl. No.: 13/079,997

(22) Filed: Apr. 5, 2011

(65) Prior Publication Data
US 2012/0256847 A1  Oct. 11, 2012

(51) Int. Cl.
*G06F 3/041* (2006.01)
*G06F 3/0488* (2013.01)

(52) U.S. Cl.
CPC .......... *G06F 3/0488* (2013.01); *G06F 3/04883* (2013.01); *G06F 3/04886* (2013.01)
USPC ........... 345/173; 345/157; 715/767; 715/784; 705/14.27

(58) Field of Classification Search
USPC .................................. 345/173–182
See application file for complete search history.

(56) References Cited

U.S. PATENT DOCUMENTS

| | | |
|---|---|---|
| 5,119,079 A | 6/1992 | Hube et al. |
| 7,777,732 B2 | 8/2010 | Herz et al. |
| 8,255,836 B1 | 8/2012 | Gildfind |
| 2002/0084991 A1 | 7/2002 | Harrison et al. |
| 2003/0073430 A1 | 4/2003 | Robertson et al. |
| 2007/0236475 A1 | 10/2007 | Wherry |
| 2007/0295540 A1 | 12/2007 | Nurmi |
| 2008/0158170 A1* | 7/2008 | Herz et al. .......... 345/173 |
| 2008/0165141 A1 | 7/2008 | Christie |
| 2008/0174570 A1 | 7/2008 | Jobs et al. |
| 2008/0188267 A1 | 8/2008 | Sagong |
| 2009/0002332 A1 | 1/2009 | Park et al. |
| 2009/0066789 A1* | 3/2009 | Baum et al. .......... 348/143 |
| 2009/0164905 A1 | 6/2009 | Ko |
| 2009/0195515 A1* | 8/2009 | Lee .......... 345/173 |
| 2009/0225041 A1 | 9/2009 | Kida et al. |

(Continued)

FOREIGN PATENT DOCUMENTS

| | | |
|---|---|---|
| CA | 2681102 | 4/2010 |
| CA | 2738055 | 4/2010 |

(Continued)

OTHER PUBLICATIONS

European Patent Application No. 11161219.8, European Search Report dated Sep. 9, 2011.

(Continued)

*Primary Examiner* — Kevin M Nguyen
*Assistant Examiner* — Kenneth B Lee, Jr.
(74) *Attorney, Agent, or Firm* — Hanley, Flight & Zimmerman, LLC

(57) ABSTRACT

A method includes displaying, on a touch-sensitive display, information associated with a first application and information associated with a second application, detecting on the touch-sensitive display, a touch at a first location associated with the first application, reporting the touch as a first touch type to the first application, and when the first touch type is not utilized by the first application within a threshold period of time and when movement of the touch on the touch-sensitive display is detected, reporting the touch to the second application.

20 Claims, 7 Drawing Sheets

(56) References Cited

U.S. PATENT DOCUMENTS

| | | | |
|---|---|---|---|
| 2010/0083190 | A1 | 4/2010 | Roberts et al. |
| 2010/0146459 | A1 | 6/2010 | Repka |
| 2010/0171713 | A1 | 7/2010 | Kwok et al. |
| 2010/0214218 | A1 | 8/2010 | Vaisanen et al. |
| 2010/0295780 | A1 | 11/2010 | Vaisanen et al. |
| 2010/0315438 | A1 | 12/2010 | Horodezky et al. |
| 2010/0333011 | A1 | 12/2010 | Kornev et al. |
| 2011/0007021 | A1 | 1/2011 | Bernstein et al. |
| 2011/0019662 | A1 | 1/2011 | Katis et al. |
| 2011/0069018 | A1 | 3/2011 | Atkins et al. |
| 2011/0102464 | A1 | 5/2011 | Godavari |
| 2011/0157089 | A1 | 6/2011 | Rainisto |
| 2012/0030570 | A1 | 2/2012 | Migos |
| 2012/0169776 | A1 | 7/2012 | Rissa et al. |

FOREIGN PATENT DOCUMENTS

| | | |
|---|---|---|
| CA | 2739167 | 4/2010 |
| EP | 1674976 | 6/2006 |
| EP | 2189889 | 5/2010 |
| WO | 2006/094308 | 9/2006 |

OTHER PUBLICATIONS

Website: http://www.killersites.com/articles/articles_FlashUse.htm published at least as early as Mar. 23, 2011.

Website: http://en.wikipedia.org/wiki/Adobe_Flash published at least as early as Mar. 23, 2011.

Website: http://www.adobe.com/products/flashplayer/ published at least as early as Mar. 23, 2011.

Website: http://www.roughlydrafted.com/2010/02/20/an-adobe-flash-developer-on-why-the-ipad-cant-use-flash published Feb. 20, 2010.

Dilger, Daniel Eran, "An Adobe Flash developer on why the iPad can't use Flash", Roughly Drafted Magazine, San Francisco, Feb. 20, 2010 (3 pages).

Nokia N900 User Guide, Issue 4, 1996-2010, Nokia Corporation, see p. 42, and pp. 1-137 (137 pages).

Turn off cursor pointer for touch use, Microsoft answers, retrieved from the internet on Aug. 2, 2012, <<http://answers.microsoft.com/en-us/windows/forum/windows_vista-desktop . . . >>, see last comment on p. 3 and continued to p. 4, and pp. 1-4 (4 pages).

Korpelainen, Mikko, "Maemo Browser—Hover mode", <<http://www.slideshare.net/mtkorpel/maemo-browser>>, Oct. 13, 2009 (1 page).

"Cypress's New Hover Detection for TrueTouch Touchscreen Solution Indicates Where a Finger Will Touch as It Approaches Screen," Cypress Semiconductor Corp., Press Release, last updated on Apr. 20, 2010 (2 pages).

Hochrum "Long Tap is the new Hover," <http://grenzgenial.com/post/2429779568/longtap-is-the-new-hover>, retrieved from the internet Mar. 22, 2011 (2 pages).

Brimelow, Lee, "Flash Works on Touch-Based Devices," <http://blog.theflashblog.com/?p=2027>, May 12, 2010 (17 pages).

European Patent Office, "Communication Pursuant to Article 94(3) EPC," issued in connection with EP patent application serial No. 11161222.2, on Feb. 5, 2013, (7 pages).

European Patent Office, "Extended European Search Report," for EP patent application serial No. 11161222.2, issued on Sep. 13, 2011 (8 pages).

European Patent Office, "Communication Pursuant to Article 94(3) EPC", for EP patent application serial No. 11161222.2, issued on Jul. 25, 2012 (6 pages).

International Searching Authority, "Written Opinion and International Search Report", for international patent application serial No. PCT/CA2012/000338, mailed May 24, 2012 (10 pages).

United States Patent and Trademark Office, "Non-Final Office Action", for U.S. Appl. No. 13/079,990, issued on Jun. 8, 2012 (23 pages).

United States Patent and Trademark Office, "Non-Final Office Action", for U.S. Appl. No. 13/436,392, issued on Jun. 7, 2012, (24 pages).

United States Patent and Trademark Office, "Final Office Action", for U.S. Appl. No. 13/436,392, issued on Oct. 12, 2012 (26 pages).

United States Patent and Trademark Office, "Final Office Action", for U.S. Appl. No. 13/079,990, issued on Oct. 12, 2012 (21 pages).

United States Patent and Trademark Office, "Non-Final Office Action", for U.S. Appl. No. 13/079,990, issued on Jul. 24, 2013 (22 pages).

European Patent Office, "Communication Pursuant to Article 94(3) EPC," issued in connection with EP application No. 11161222.2, on Aug. 22, 2013 (5 pages).

Canadian Intellectual Property Office, "Office Action," issued in connection with application No. CA 2,773,818, on May 27, 2014, 4 pages.

Taiwan Patent Office, "Office Action and Search Report," issued in connection with application No. TW 101111917, on May 29, 2014, 11 pages.

European Patent Office, "Summons to attend oral proceedings," issued in connection with EP patent application serial No. 11161222.2, on Mar. 26, 2014, 4 pages.

United States Patent and Trademark Office, "Non-Final Office Action," issued in connection with U.S. Appl. No. 13/079,990, on Dec. 30, 2013, 32 pages.

United States Patent and Trademark Office, "Examiner's Answer," issued in connection with U.S. Appl. No. 13/436,392, on May 8, 2013, 23 pages.

United States Patent and Trademark Office, "Final Office Action," issued in connection with U.S. Appl. No. 13/079,990, on Jun. 13, 2014, 34 pages.

European Patent Office, "Communication pursuant to Article 94(3) EPC," issued in connection with application No. EP 11161219.8, on Jun. 12, 2014, 6 pages.

United States Patent and Trademark Office, "Advisory Action," issued in connection with U.S. Appl. No. 13/079,990, on Aug. 22, 2014, 12 pages.

\* cited by examiner

ELECTRONIC DEVICE AND METHOD OF CONTROLLING SAME

FIELD OF TECHNOLOGY

The present disclosure relates to electronic devices including, but not limited to, portable electronic devices having touch-sensitive displays and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touchscreen display, is particularly useful on handheld devices, which are small and may have limited space for user input and output. The information displayed on the display may be modified depending on the functions and operations being performed.

Improvements in electronic devices with displays are desirable.

DETAILED DESCRIPTION

Figure 1:
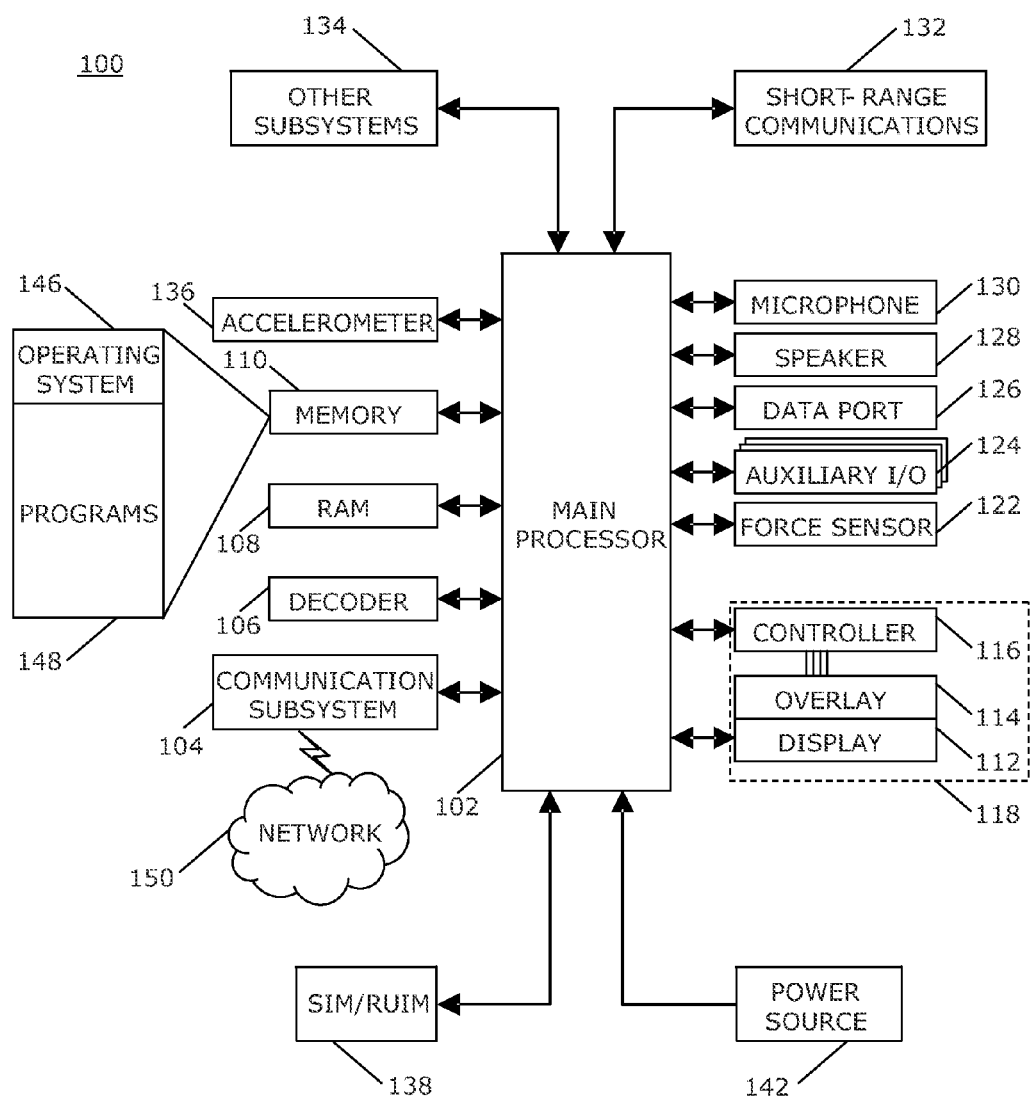
FIG. 1 is a block diagram of an example of a portable electronic device in accordance with the disclosure.

The following describes an electronic device and a method that includes displaying, on a touch-sensitive display, information associated with a first application and information associated with a second application, detecting on the touch-sensitive display, a touch at a first location associated with the first application, reporting the touch as a first touch type to the first application, and when the first touch type is not utilized by the first application within a threshold period of time and when movement of the touch on the touch-sensitive display is detected, reporting the touch to the second application.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, which is a portable or non-portable electronic device in the embodiments described herein. Examples of portable electronic devices include mobile, or handheld, wireless communication devices such as pagers, cellular phones, cellular smart-phones, wireless organizers, PDAs, wirelessly enabled notebook computers, tablet computers, and so forth. Examples of non portable electronic devices include electronic white boards, for example, on a wall, smart boards utilized for collaboration, built-in displays in furniture or appliances, and so forth. The portable electronic device may also be a portable electronic device without wireless communication capabilities.

A block diagram of an example of an electronic device 100 is shown in FIG. 1. The electronic device 100, which may be a portable electronic device, includes multiple components, such as a processor 102 that controls the overall operation of the electronic device 100. The electronic device 100 presently described optionally includes a communication subsystem 104 and a short-range communications 132 module to perform various communication functions, including data and voice communications. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, one or more optional force sensors 122, an auxiliary input/output (I/O) subsystem 124, a data port 126, a speaker 128, a microphone 130, short-range communications 132, and other device subsystems 134. User-interaction with a graphical user interface is performed through the touch-sensitive overlay 114. The processor 102 interacts with the touch-sensitive overlay 114 via the electronic controller 116. Information, such as text, characters, symbols, images, icons, and other items that may be displayed or rendered on an electronic device, is displayed on the touch-sensitive display 118 via the processor 102. The processor 102 may interact with an orientation sensor such as an accelerometer 136 to detect direction of gravitational forces or gravity-induced reaction forces, for example, to determine the orientation of the electronic device 100.

To identify a subscriber for network access, the electronic device 100 may optionally use a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104, for example. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display may include a capacitive touch-sensitive overlay 114. The overlay 114 may be an assembly of multiple layers in a stack including, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

The display 112 of the touch-sensitive display 118 includes a display area in which information may be displayed, and a non-display area extending around the periphery of the display area. Information is not displayed in the non-display area, which is utilized to accommodate, for example, electronic traces or electrical connections, adhesives or other sealants, and/or protective coatings around the edges of the display area.

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable input member, such as a finger, thumb, appendage, or other items, for example, a stylus, pen, or other pointer, depending on the nature of the touch-sensitive display 118. The controller 116 and/or the processor 102 may detect a touch by any suitable input member on the touch-sensitive display 118. Multiple simultaneous touches may be detected. Movement of a touch on the touch-sensitive display 118 may also be detected.

One or more gestures may be detected by the touch-sensitive display 118. A gesture, such as a swipe, also known as a flick, is a particular type of touch on a touch-sensitive display 118 and may begin at an origin point and continue to an end point. A gesture may be identified by attributes of the gesture, including the origin point, the end point, the distance traveled, the duration, the velocity, and the direction, for example. A gesture may be long or short in distance and/or duration. Two points of the gesture may be utilized to determine a direction of the gesture.

An optional force sensor 122 or force sensors may be disposed in any suitable location, for example, between the touch-sensitive display 118 and a back of the electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
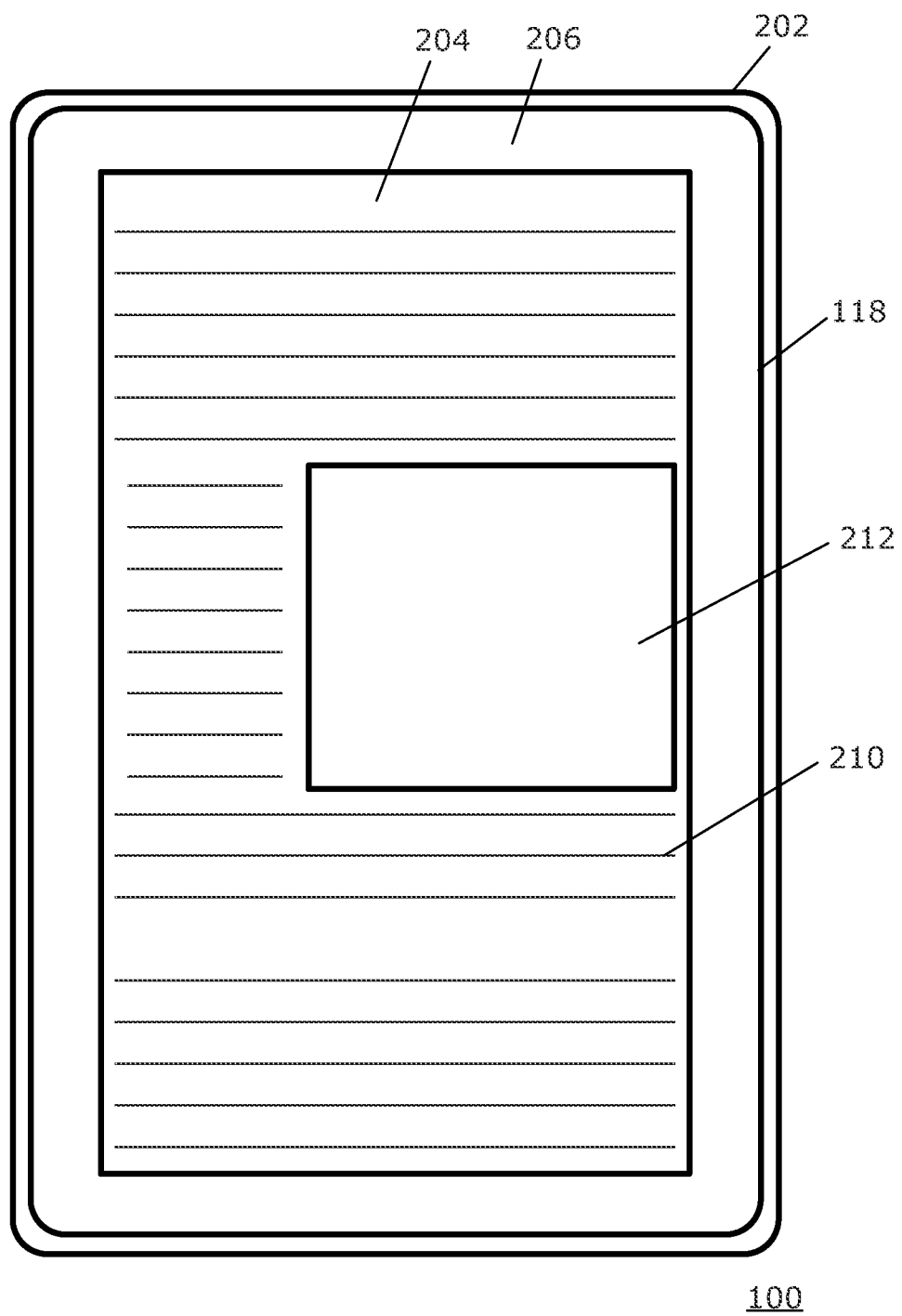
FIG. 2 is a front view of an example of a portable electronic device in accordance with the disclosure.

A front view of an example of the electronic device 100 is shown in FIG. 2. The electronic device 100 includes a housing 202 in which the touch-sensitive display 118 is disposed. The housing 202 and the touch-sensitive display 118 enclose components such as the components shown in FIG. 1.

The touch-sensitive overlay 114 may extend to cover the display area 204 and the non-display area 206 such that a touch on either or both the display area 204 and the non-display area 206 may be detected. The density of touch sensors may differ between the display area 204 and the non-display area 206. For example, the density of nodes in a mutual capacitive touch-sensitive display, or density of locations at which electrodes of one layer cross over electrodes of another layer, may differ between the display area 204 and the non-display area 206.

Information associated with a web page download may be displayed on the touch-sensitive display 118 and may include, for example, information from web pages, web applications, rich media applications, and widgets. In the example of FIG. 2, a web page download includes a document 210 and information associated with another application 212 that is included with, commonly referred to as embedded in, the document 210. The embedded application may be, for example, an ActionScript®-based application, an Adobe® Flash® Player application, and so forth. ActionScript, Adobe, and Flash are registered trademarks of Adobe Systems Incorporated. The document, which may be a hypertext markup language (HTML) document, includes information displayed around the embedded application and may include content that is, for example, downloaded progressively or streamed from a server.

When a web page download is displayed on the touch-sensitive display 118, information may not be visible because all the information may not fit on the touch-sensitive display 118. The text of the document 210 may not fit on the page and may be displayed by, for example, scrolling, or zooming out to increase the quantity of information displayed on the touch-sensitive display 118. Touches on the touch-sensitive display 118 may be utilized to scroll, zoom in, and zoom out. Touches on the touch-sensitive display 118 may also be utilized to control features or functions of the embedded application 212.

Typically, features or functions for such embedded applications may be controlled by an indicator-based control such as utilized on a desktop or laptop computer. An indicator, such as a cursor, may be moved utilizing, for example, a mouse or trackpad, an optical joystick, or other control device. Selectable features may be selected, for example, by depressing a mouse or trackpad button or by depressing the optical joystick when the indicator is at a location associated with the selectable feature. Input may be identified, for example, as a selection or a roll-over. Input may be identified for a roll-over in which the indicator is located on a feature without selecting the feature, and different input may be identified for a selection. A roll-over may be utilized to provide animation, to display further features or controls, to display further information or a preview of further information, or for any other suitable function. For example, a roll-over, in which the indicator is located on the speaker of an embedded media player, may be utilized to display a volume control to increase or decrease volume. Selection of the speaker may mute the volume. The term roll-over is typically utilized to describe movement of an indicator, such as a cursor or pointer, over a feature displayed on a display, without selection of the feature.

Many web or internet-based embedded applications are designed for use on a desktop or full-size computer. As such, the embedded applications are designed for use with an indicator-based control device, such as a mouse. Known applications for touch-sensitive displays convert various touch events into indicator-based control events, e.g., mouse events. All touch events do not correspond on a one-to-one base with indicator-based control events such as mouse events. For example, an end of a touch, e.g., when an input member releases or leaves the touch-sensitive display, referred to as a touch release, does not have a corresponding indicator-based control event, such as a mouse event, because an indicator-based control device such as a mouse always has a cursor or indicator location on a display. Known applications convert a touch release to an indicator-based control event, such as a mouse event, having a location that does not exist on the touch-sensitive display, e.g., (0,0) or (x,y) where x and/or y are not valid locations on the touch-sensitive display. For example, such conversions move the cursor off the display such that the cursor does not interfere with displayed content. Such touch release conversions result in functions not being performed, such as functions of an embedded application, or other undesired results. Such problems are resolved by maintaining the touch location for a touch release at a known position on the touch-sensitive display, such as the last reported position, rather than assigning a non-existent location upon a touch release.

Typically, scrolling of a web page may be controlled, for example, utilizing a scroll wheel of a mouse. Zooming in or out may also be controlled utilizing the scroll wheel. The portable electronic device 100 illustrated in FIG. 2, however, includes a touch-sensitive display 118 and touches are utilized to provide input from a user rather than a mouse or other control device. The portable electronic device 100 utilizes touches to control roll-over and selection functionality associated with the embedded application. Touches are also utilized to control scrolling and zooming of the web page.

Figure 3:
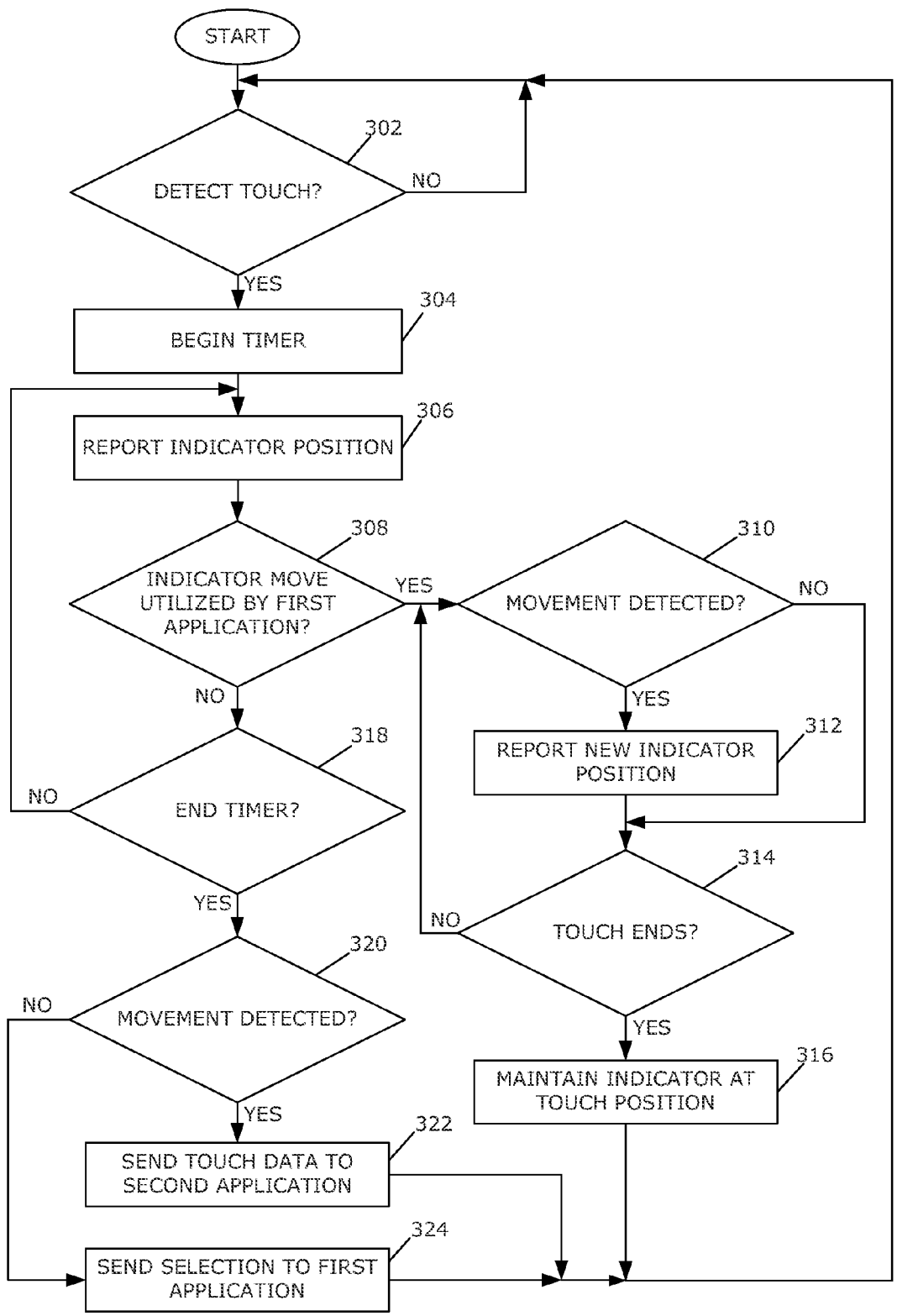
FIG. 3 is a flowchart illustrating a method of controlling the portable electronic device in accordance with the disclosure.

A flowchart illustrating a method of controlling an electronic device, such as the electronic device 100, is shown in FIG. 3. The method may be carried out by computer-readable code executed, for example, by the controller 116 and/or the processor 102. Coding of software for carrying out such a method is within the scope of a person of ordinary skill in the art given the present description. The method may contain additional or fewer processes than shown and/or described, and may be performed in a different order.

Information is displayed on the portable electronic device 100. The information may be information from a first application, such as an internet or web page download and includes information associated with an internet or web browser and information associated with an embedded application. At a given time, the information displayed may be from the first application, from the embedded application, or from both the first application and the embedded application.

A touch is detected 302 at a location associated with the embedded application. When the touch is detected, the location of the touch on the touch-sensitive display 118 is determined. A timer is started at 304. The timer may be a countdown timer, a count-up timer, or any suitable method to determine that a threshold period of time has passed after the touch is detected.

A touch is identified by touch type, for example, a roll-over or a selection. An indicator position is reported 306 to the embedded application as a roll-over in which the indicator is at a position associated with the touch location without selection.

When the embedded application utilizes the reported roll-over at 308, a response is provided by the embedded application, and the process continues at 310. When movement of the touch on the touch-sensitive display 118 is detected at 310, the new indicator position that is associated with the new touch location is reported 312 to the embedded application. Movement of the touch may be detected when the distance between a current touch location determined from the most recent scan of the touch-sensitive display 118 and a previously reported touch location determined from a previous scan differs by a threshold amount. A scan, as known in the industry, includes, for example, a plurality of frames utilizing different sensors in each frame to determine a touch location. Small movements of the touch caused by, for example, jitter or location determination errors are filtered out by reporting a new touch location when the distance between the previously reported touch location and the current touch location meets a threshold. When the touch ends or discontinues at 314, the indicator position is maintained 316 at the last reported position. A touch ends, for example, when the input member is no longer detected by the touch-sensitive display 118 after being detected by the touch-sensitive display 118.

When the embedded application does not utilize the reported touch location, such as a roll-over, at 308, a response is not provided by the embedded application, and the process continues at 318. When the time, based on the timer started at 304, does not meet a threshold at 318, the process continues at 306. When the time meets the threshold at 318, the process continues at 320. The time threshold is utilized, for example, to provide sufficient time for the embedded application to utilize the touch information, such as a roll-over, and respond.

When movement of the touch is detected at 320, the touch data is provided 322 to the application, such as a web browser, for example, to facilitate scrolling of the web page. Movement of the touch may be detected when the distance between a current touch location, determined from the most recent scan of the touch-sensitive display 118, and a previously reported touch location, determined from a previous scan, differs by a threshold amount. Small movements of the touch location caused, for example, by jitter or location determination errors are filtered out by detecting movement when the distance between touch locations meets a threshold. When movement of the touch is not detected at 320, the touch is reported 324 to the embedded application as a selection and the indicator position is maintained at the location associated with the touch.

Figure 4:
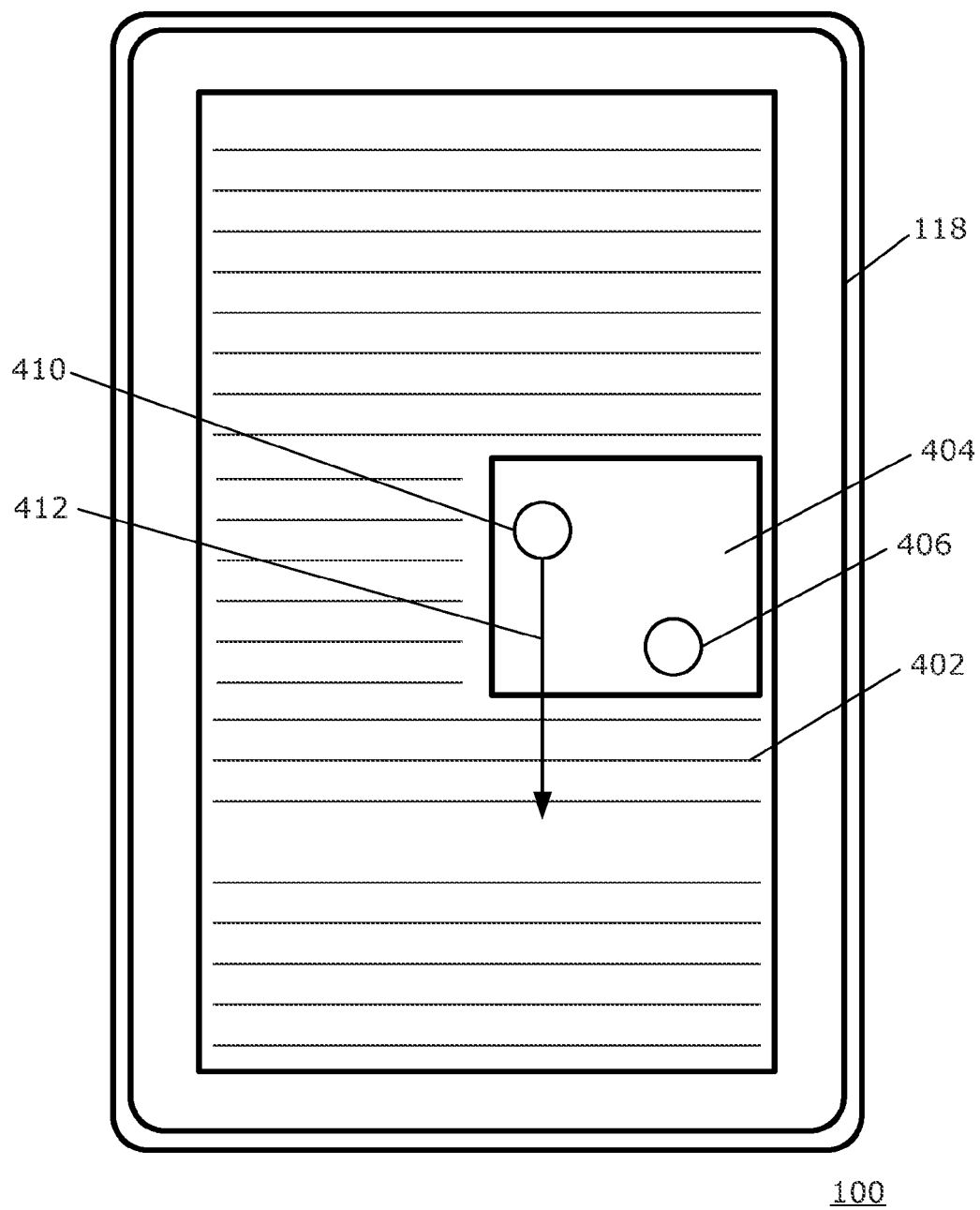
FIG. 4 and FIG. 5 illustrate examples of touches on a portable electronic device in accordance with the disclosure.
Figure 5:
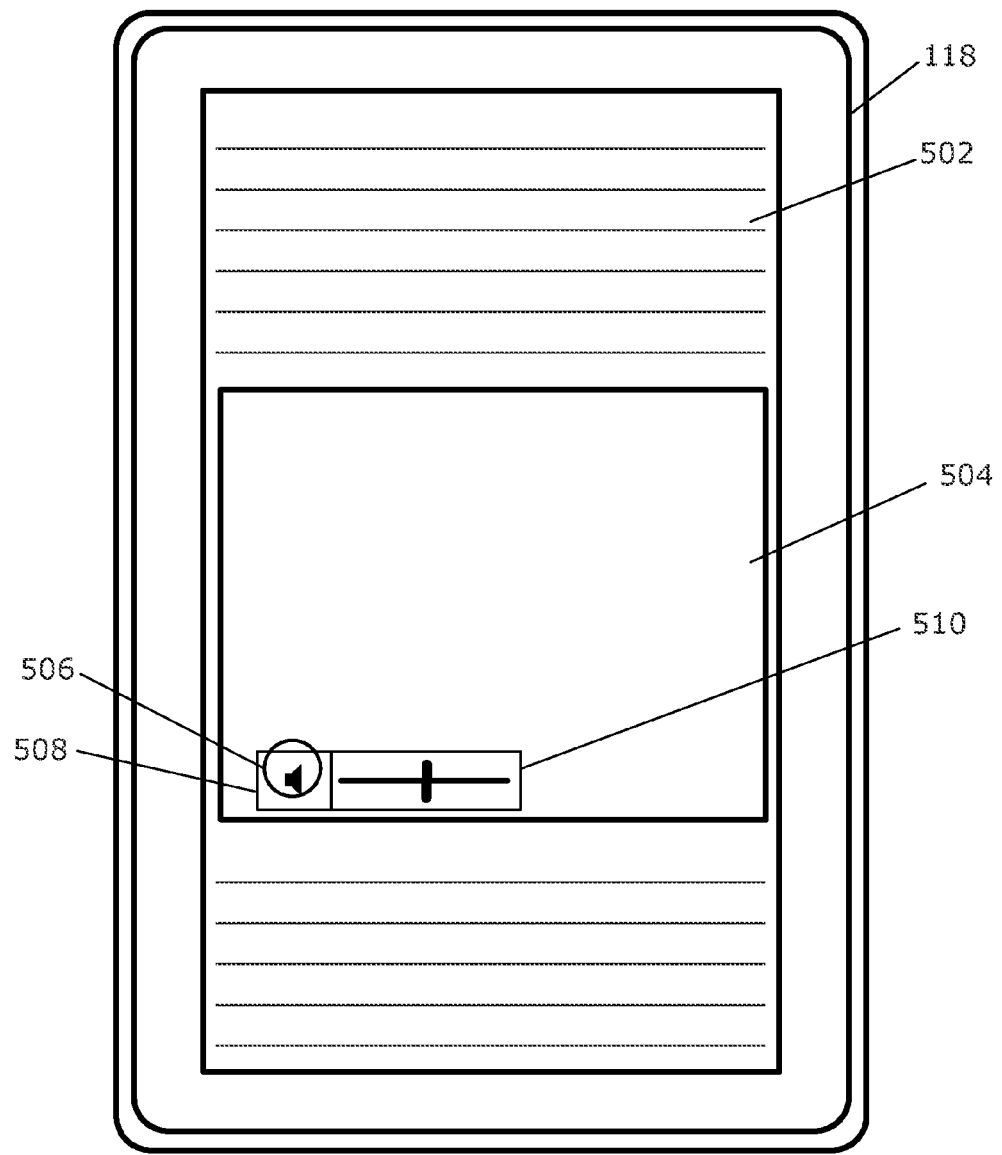

Examples of touches and information displayed on an electronic device 100 are shown in FIG. 4 and FIG. 5. The term downward is utilized to provide reference to the orientation of the electronic device in the figures and is not otherwise limiting.

In the example illustrated in FIG. 4, information including an HTML document 402 and an advertisement 404 associated with an embedded application, e.g., an ActionScript-based application, are displayed on the touch-sensitive display 118. A touch at a touch location 406 on the touch-sensitive display 118 at a location associated with the embedded application 404, e.g., an ActionScript-based advertisement, is illustrated by a circle on the touch-sensitive display 118. The touch is detected and the indicator position is reported to the embedded application. The indicator position is not utilized by the embedded application and a response is not received within a threshold period of time. Movement of the touch is not detected, and the advertisement 404 is selected. Selection of the advertisement 404 may, for example, open another webpage associated with the advertisement. Thus, the embedded application is engaged.

Another example of a touch on the touch-sensitive display 118 is illustrated by the circle 410 and the arrow 412 leading from the circle 410. In this example, the touch is a swipe in a downward direction in the orientation illustrated in FIG. 4. The touch begins at the circle 410 at a location associated with the embedded advertisement 404. The touch is detected and the indicator position is reported to the embedded application. The indicator position is not utilized by the embedded application and a response is not received within a threshold period of time. Movement of the touch is detected and the touch data is sent to the HTML application to scroll downwardly. Thus, the embedded application is not engaged.

In the example illustrated in FIG. 5, information including an HTML document 502 and media player 504 associated with an embedded application, e.g., a Flash media application, is displayed on the touch-sensitive display 118. A touch on the touch-sensitive display 118 at a location 506 associated with the media player 504 is illustrated by a circle on the touch-sensitive display 118. The touch is detected and the indicator position is reported to the embedded application as a roll-over. The roll-over is utilized by the embedded application and a response is received from the embedded application within a threshold period of time. In the example of FIG. 5, the touch is associated with a displayed selectable speaker icon 508 and a volume control 510 is displayed in response to the roll-over. When the touch ends on the selectable speaker icon 508, the indicator position is maintained at a location associated with the selectable speaker icon 508, and display of the volume control 510 continues. The volume control 510 may be selected, for example, by a subsequent touch to move the control to increase or decrease volume. Thus, the volume control of the embedded application is engaged and managed.

Figure 6:
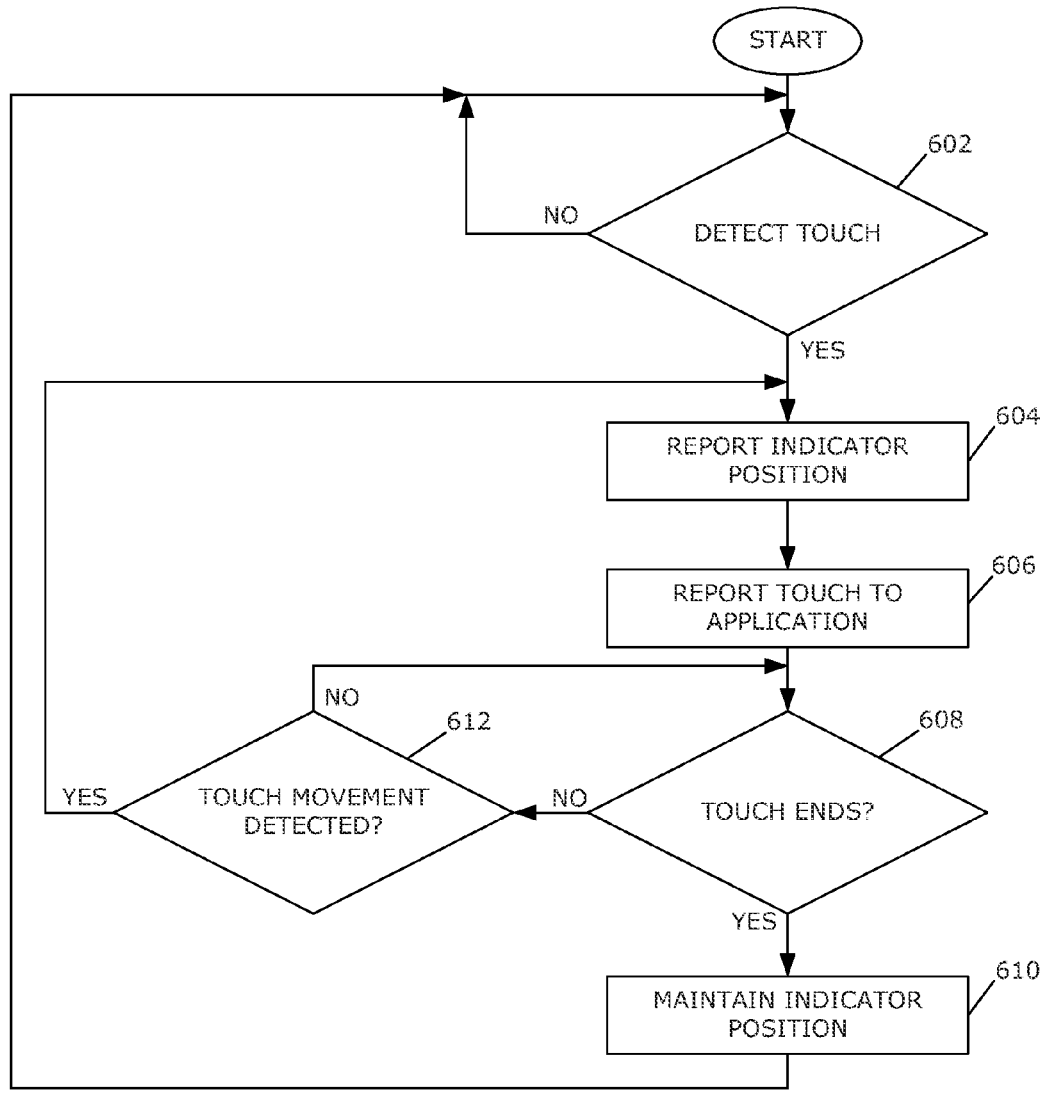
FIG. 6 is a flowchart illustrating another method of controlling the portable electronic device in accordance with the disclosure.

A flowchart illustrating another method of controlling an electronic device, such as the electronic device 100, is shown in FIG. 6. The method may be carried out by computer-readable code executed, for example, by the controller 116 and/or the processor 102. Coding of software for carrying out such a method is within the scope of a person of ordinary skill in the art given the present description. The method may contain additional or fewer processes than shown and/or described, and may be performed in a different order.

Information associated with an embedded application is displayed on the electronic device 100, which may be a portable electronic device. The information may be displayed in response to selection of an option to display the embedded application across the full width of the display area from within a first application. Information associated with the first application, such as an HTML document, is not displayed. A touch is detected 602 at a location associated with the application. When the touch is detected, the location of the touch on the touch-sensitive display 118 is determined. An indicator position is reported 604 to the embedded application as a roll-over in which the indicator is at a position associated with the touch location. The touch is also reported 606 to the application as a selection to select a feature associated with the touch location.

When the touch continues, e.g., does not end, at 608, and movement is detected at 612, the indicator position is reported as a roll-over in which the indicator is at a position associated with the new touch location. Movement of the touch may be detected as described above.

When the touch ends at 608, the indicator position is maintained 610 at the last reported position. An indicator may optionally be displayed at the location or position where the indicator is maintained.

Figure 7:
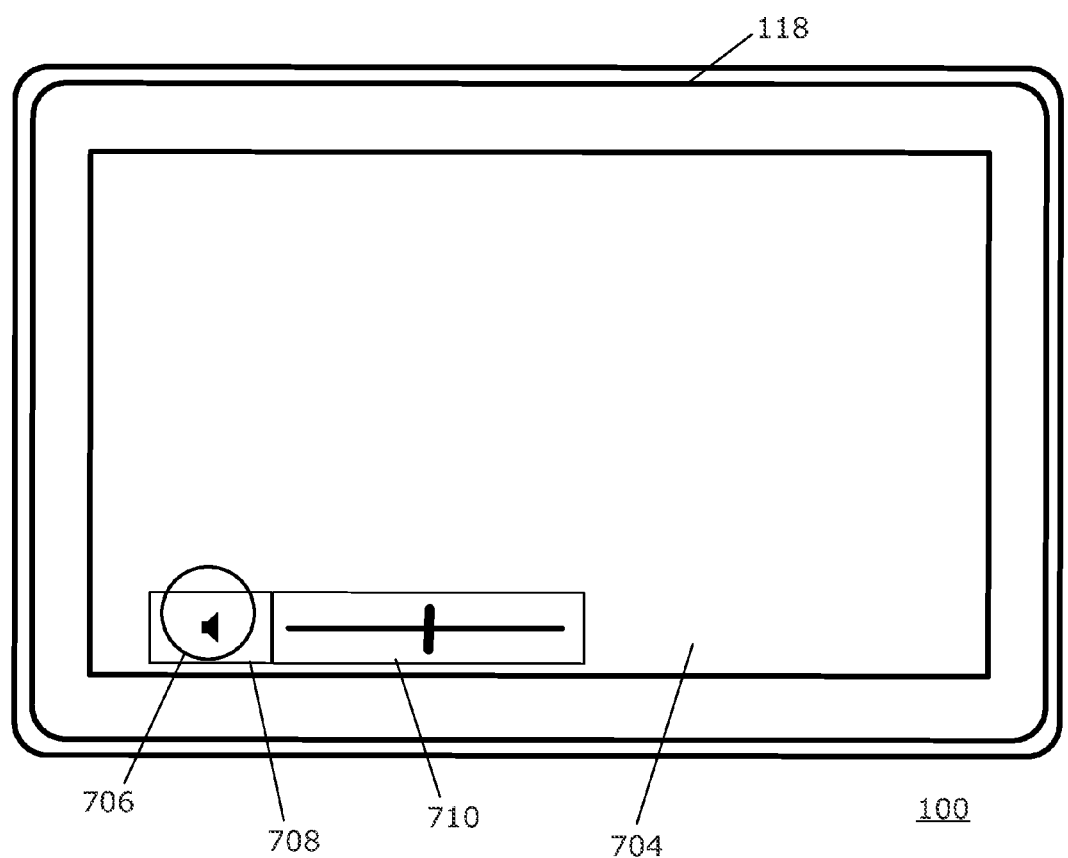
FIG. 7 illustrates another example of a touch on a portable electronic device in accordance with the disclosure.

An example of a touch and information displayed on an electronic device 100 is shown in FIG. 7. The information displayed is a media player 704 associated with an embedded application, such as a Flash media application. A touch on the touch-sensitive display 118 at a location 706 associated with the media player 704 is illustrated by a circle on the touch-sensitive display 118. The touch is detected and the indicator position is reported to the embedded application as a roll-over. The touch is also reported to the embedded application as a selection. In the example of FIG. 7, the touch is at a location 706 that is associated with a displayed selectable speaker icon 708, and a volume control 710 is displayed in response to the roll-over. The volume is also muted when the selection is reported. When the touch ends on the selectable speaker icon 708, the indicator position is maintained at the selectable speaker icon 708 and display of the volume control 710 continues. The volume control 710 may be selected by a subsequent touch to move the control, to take the volume off mute, and to increase and decrease the volume.

By maintaining the position of the indicator at the last touch location, selectable features that are displayed utilizing a roll-over may be displayed after the touch ends, facilitating selection utilizing a subsequent touch. In the situation of an embedded application in an HTML document, touches on the touch-sensitive display 118 may be utilized by either the embedded application or the HTML document without loss of functionality. Utilizing a timer or delay period, the portable electronic device may wait to receive a response from the embedded application. The touch data may be provided to the HTML document, for example, for scrolling or zooming, when a response is not received within the time period.

A method includes displaying, on a touch-sensitive display, information associated with a first application and information associated with a second application, detecting on the touch-sensitive display, a touch at a first location associated with the first application, reporting the touch as a first touch type to the first application, and when the first touch type is not utilized by the first application within a threshold period of time and when movement of the touch on the touch-sensitive display is detected, reporting the touch to the second application The present disclosure may be embodied in other specific forms without departing from its spirit or essential characteristics. The described embodiments are to be considered in all respects only as illustrative and not restrictive. The scope of the present disclosure is, therefore, indicated by the appended claims rather than by the foregoing description. All changes that come within the meaning and range of equivalency of the claims are to be embraced within their scope.

What is claimed is:

1. A method comprising:
   displaying, on a touch-sensitive display, information associated with a first application and information associated with a second application, wherein the second application is embedded in the first application;
   detecting, on the touch-sensitive display, a touch at a first location associated with the first application and detecting movement of the touch;
   reporting the touch as a first touch type to the first application;
   determining that the touch reported to the first application as the first touch type is not utilized by the first application when a response is not received from the first application within a threshold period of time; and
   when the first touch type is not utilized and when the movement of the touch is detected, reporting the touch to the second application to scroll the second application.

2. The method according to claim 1, comprising when the touch is not utilized by the first application within the threshold period of time, and when movement of the touch on the touch-sensitive display is not detected, reporting the touch to the first application as a second touch type.

3. The method according to claim 2, wherein the first touch type comprises a roll-over and the second touch type comprises a selection.

4. The method according to claim 1, wherein the first touch type comprises a roll-over.

5. The method according to claim 1, wherein reporting the touch as the first touch type comprises reporting an indicator position associated with the first location.

6. The method according to claim 1, comprising detecting movement of the touch to a second location and reporting the movement of the touch as the first touch type to the first application.

7. The method according to claim 1, wherein reporting the touch as the first touch type comprises reporting an indicator position and wherein the indicator position is maintained when the touch ends.

8. The method according to claim 1, wherein reporting the touch as the first touch type comprises reporting the touch at the first location.

9. The method according to claim 1, wherein when the touch moves to a second location within the threshold period of time, the method comprises reporting the second location to the first application.

10. The method according to claim 1, wherein the first application comprises an embedded application.

11. The method according to claim 1, wherein the first application is embedded in a webpage.

12. The method according to claim 1, wherein the second application comprises a browser application.

13. The method according to claim 1, wherein movement of the touch is detected when a distance between a second location of the touch and the first location meets a threshold.

14. The method according to claim 1, wherein movement of the touch is not detected when a distance between a second location of the touch and the first location does not meet a threshold.

15. A non-transitory computer-readable medium having computer-readable code executable by at least one processor of an electronic device to:
   display, on a touch-sensitive display, information associated with a first application and information associated with a second application, wherein the second application is embedded in the first application;
   detect on the touch-sensitive display, a touch at a first location associated with the first application;
   detect movement of the touch;
   report the touch as a first touch type to the first application;
   determine that the touch reported to the first application as the first touch type is not utilized by the first application when a response is not received from the first application within a threshold period of time; and
   when the first touch type is not and when the movement of the touch is detected, report the touch to the second application to scroll the second application.

16. An electronic device comprising:
   a touch-sensitive display; and
   a processor coupled to the touch-sensitive display and configured to:
      display information associated with a first application and information associated with a second application, wherein the second application is embedded in the first application,
      detect a touch at a first location associated with the first application, detect movement of the touch;
      report the touch as a first touch type to the first application, and
      determine that the touch reported to the first application as the first touch type is not utilized by the first application when a response is not received from the first application within a threshold period of time; and
      when the first touch type is not utilized and when the movement of the touch is detected, report the touch to the second application to scroll the second application.

17. The electronic device according to claim 16, wherein when the touch is not utilized by the first application within the threshold period of time and when movement of the touch on the touch-sensitive display is not detected, the touch is reported to the first application as a second touch type.

18. The electronic device according to claim 17, the first touch type comprises a roll-over and the second touch type comprises a selection.

19. The electronic device according to claim 16, wherein the first application comprises an embedded application, and wherein the second application comprises a browser application.

20. The electronic device according to claim 16, wherein is detected when a distance between a second location of the touch and the first location meets a threshold.

* * * * *